US011178398B2

(12) United States Patent
Raut

(10) Patent No.: US 11,178,398 B2
(45) Date of Patent: Nov. 16, 2021

(54) METHOD AND ELECTRONIC DEVICE FOR CODING A SEGMENT OF AN INTER FRAME

(71) Applicant: SAMSUNG ELECTRONICS CO., LTD., Suwon-si (KR)

(72) Inventor: Samantray Biplab Raut, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 522 days.

(21) Appl. No.: 16/093,467

(22) PCT Filed: Feb. 16, 2017

(86) PCT No.: PCT/KR2017/001696
§ 371 (c)(1),
(2) Date: Oct. 12, 2018

(87) PCT Pub. No.: WO2017/191891
PCT Pub. Date: Nov. 9, 2017

(65) Prior Publication Data
US 2021/0195185 A1    Jun. 24, 2021

(30) Foreign Application Priority Data

May 6, 2016   (IN) .............................. 201641015895
Oct. 20, 2016  (IN) .............................. 201641015895

(51) Int. Cl.
*H04N 19/119*   (2014.01)
*H04N 19/105*   (2014.01)
(Continued)

(52) U.S. Cl.
CPC ......... *H04N 19/119* (2014.11); *H04N 19/105* (2014.11); *H04N 19/13* (2014.11);
(Continued)

(58) Field of Classification Search
None
See application file for complete search history.

(56) References Cited

U.S. PATENT DOCUMENTS

2014/0226728 A1    8/2014  Cheng et al.
2015/0010082 A1*   1/2015  Iwata .................... H04N 19/55
                                                   375/240.16
(Continued)

OTHER PUBLICATIONS

Anonymous, "Series H: Audiovisual and Multimedia Systems: Infrastructure of audiovisual services—Coding of moving video", Apr. 2015, Telecommunication and Standardization Sector of ITU, 634 pages total.

(Continued)

*Primary Examiner* — Lindsay J Uhl
(74) *Attorney, Agent, or Firm* — Sughrue Mion, PLLC

(57) ABSTRACT

Example embodiments herein provide a method for coding a segment of an inter frame. The method includes partitioning, by a partitioning unit, a current frame into a plurality of segments. Further, the method includes coding, by a coding unit, a current spatial block at a boundary of a segment included among the plurality of segments by deriving at least one new temporal motion information predictor candidate from a reference frame. Further, the method includes cabac context initialization at the start of each non-first segment from the plurality of segments by deriving temporal stored cabac context from the reference frame.

16 Claims, 5 Drawing Sheets

CURRENT FRAME

(51) Int. Cl.
*H04N 19/13* (2014.01)
*H04N 19/137* (2014.01)
*H04N 19/159* (2014.01)
*H04N 19/176* (2014.01)

(52) U.S. Cl.
CPC ......... *H04N 19/137* (2014.11); *H04N 19/159* (2014.11); *H04N 19/176* (2014.11)

(56) References Cited

U.S. PATENT DOCUMENTS

| | | | |
|---|---|---|---|
| 2015/0156501 A1* | 6/2015 | Hannuksela | H04N 19/70 375/240.12 |
| 2015/0264351 A1 | 9/2015 | Miyoshi | |
| 2015/0358639 A1 | 12/2015 | Park et al. | |
| 2020/0169726 A1* | 5/2020 | Kim | H04N 19/159 |

OTHER PUBLICATIONS

Misra, et al., "An Overview of Tiles in HEVC", Dec. 2013, IEEE Journal of Selected Topics in Signal Processing, vol. 7, Issue No. 6, pp. 969-977.
Search Report dated May 30, 2017, issued by the International Searching Authority in counterpart International Patent Application No. PCT/KR2017/001696 (PCT/ISA/210).
Written Opinion dated May 30, 2017, issued by the International Searching Authority in counterpart International Patent Application No. PCT/KR2017/001696 (PCT/ISA/237).

* cited by examiner

[Fig. 1]
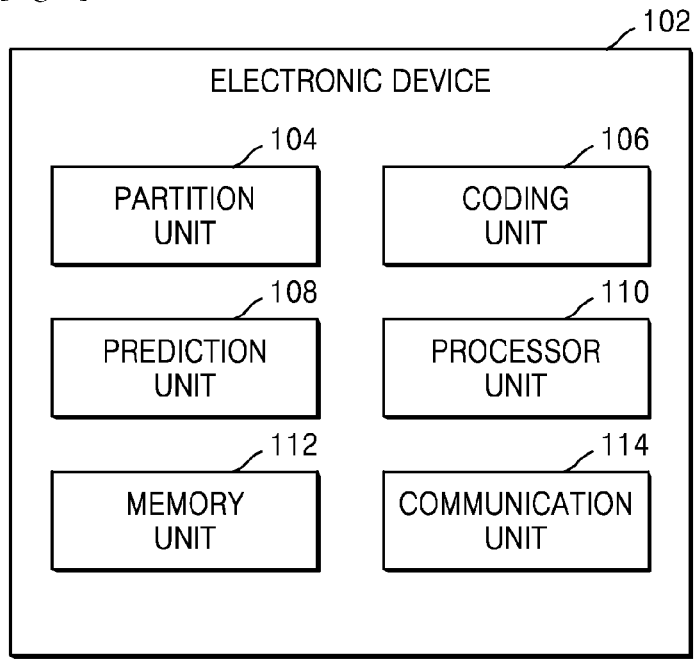
[Fig. 2a]
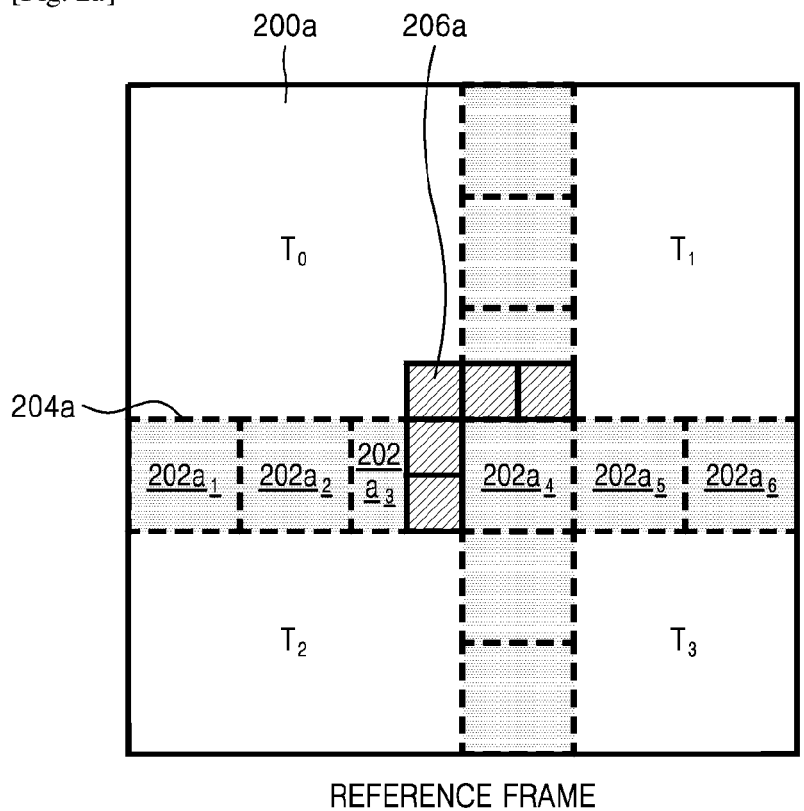
REFERENCE FRAME

[Fig. 2b]
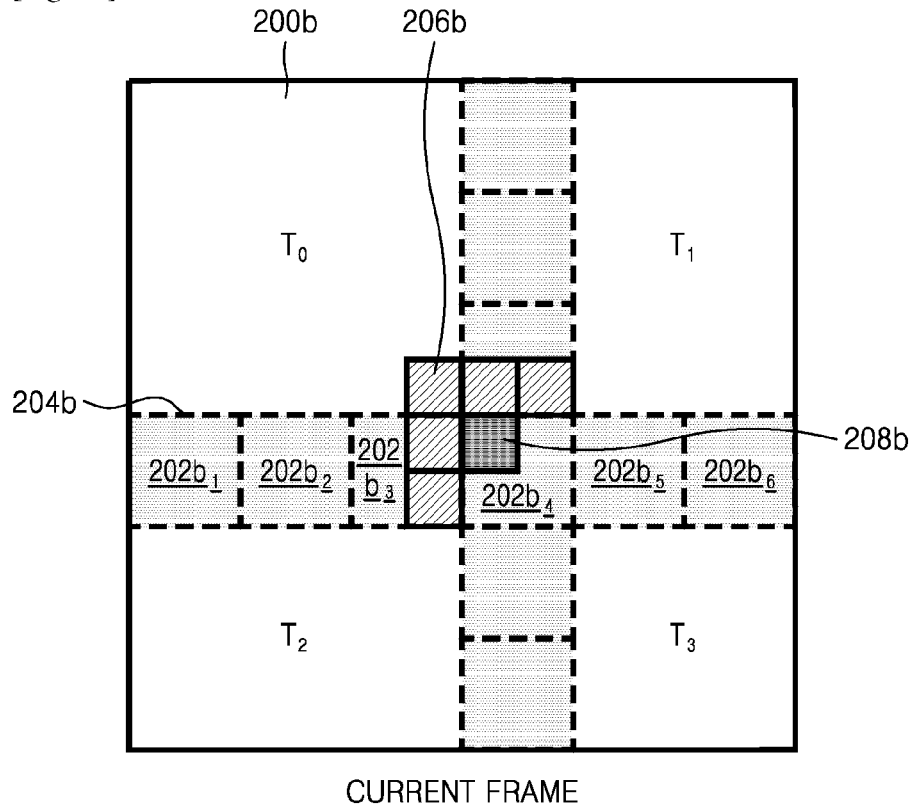
CURRENT FRAME
[Fig. 3a]
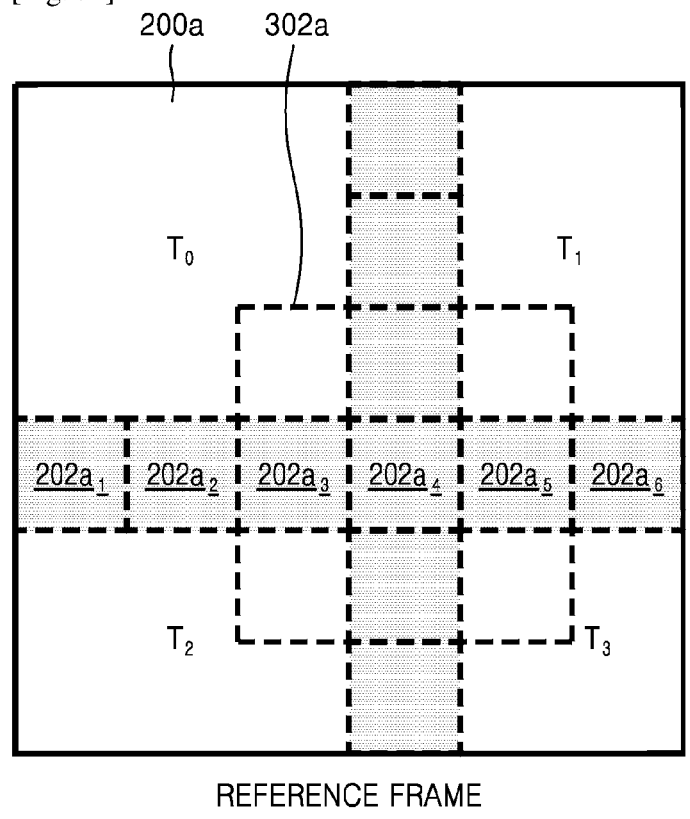
REFERENCE FRAME

[Fig. 3b]
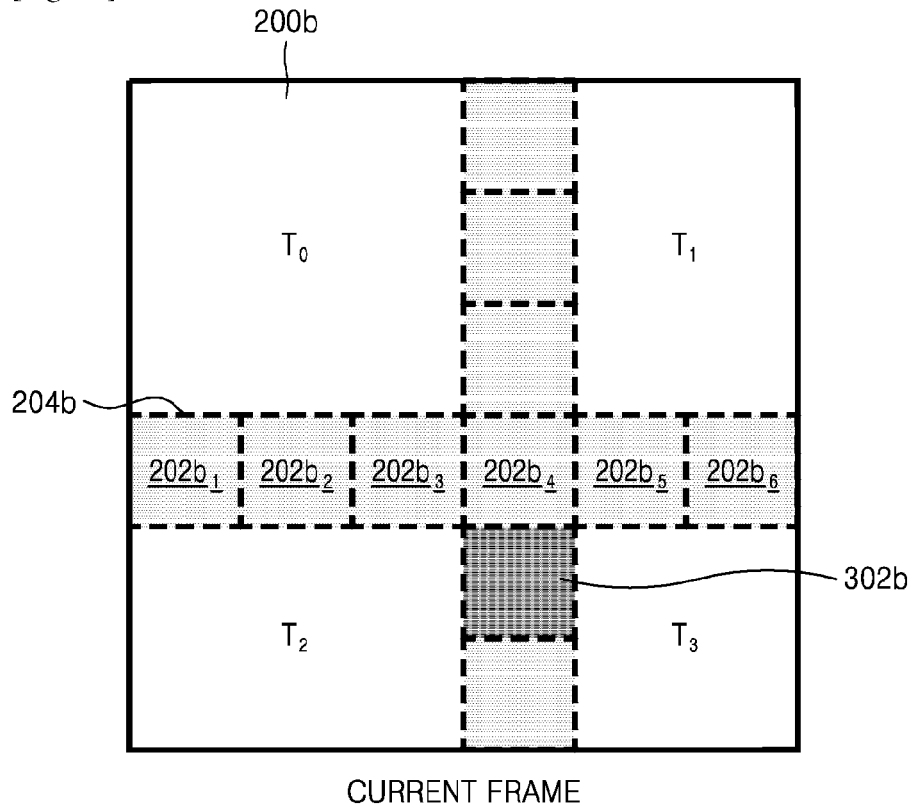
CURRENT FRAME
[Fig. 4a]
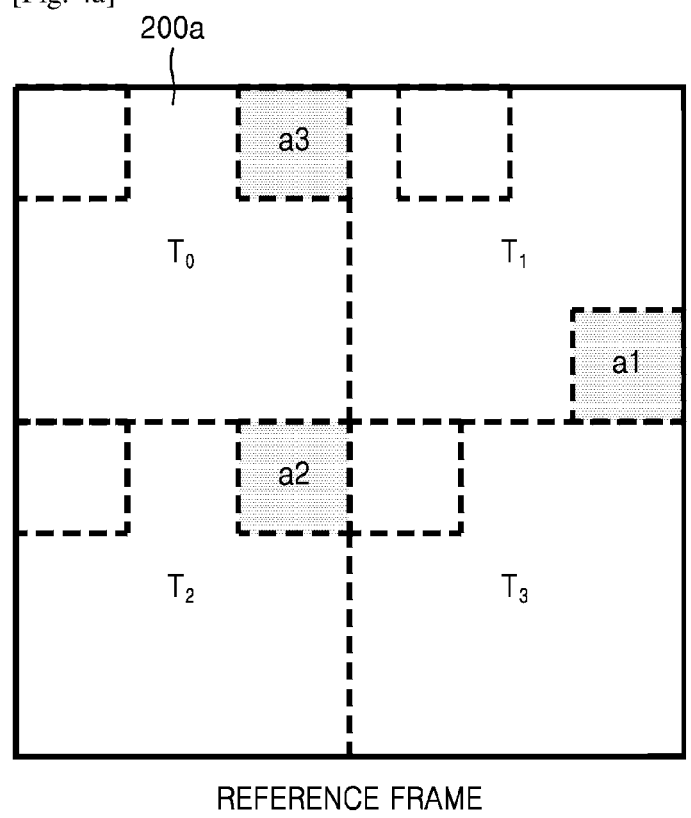
REFERENCE FRAME

[Fig. 4b]
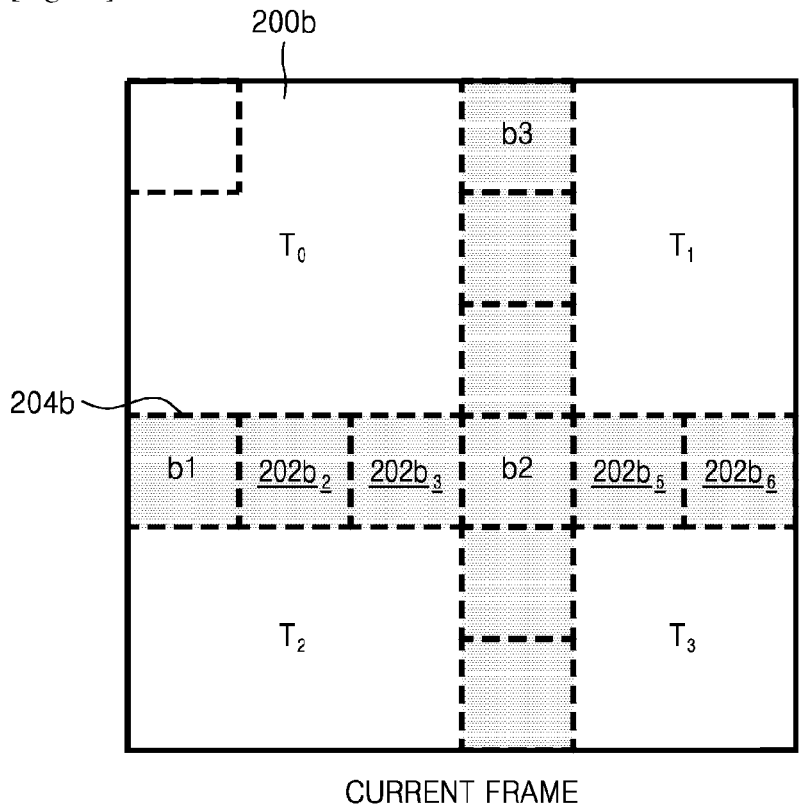
CURRENT FRAME
[Fig. 5]
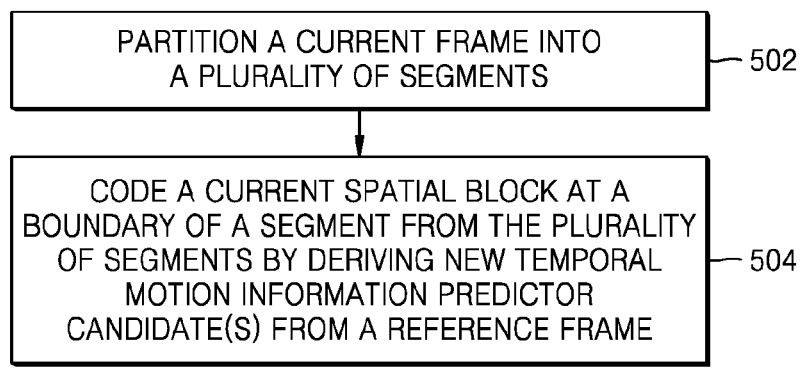

[Fig. 6]
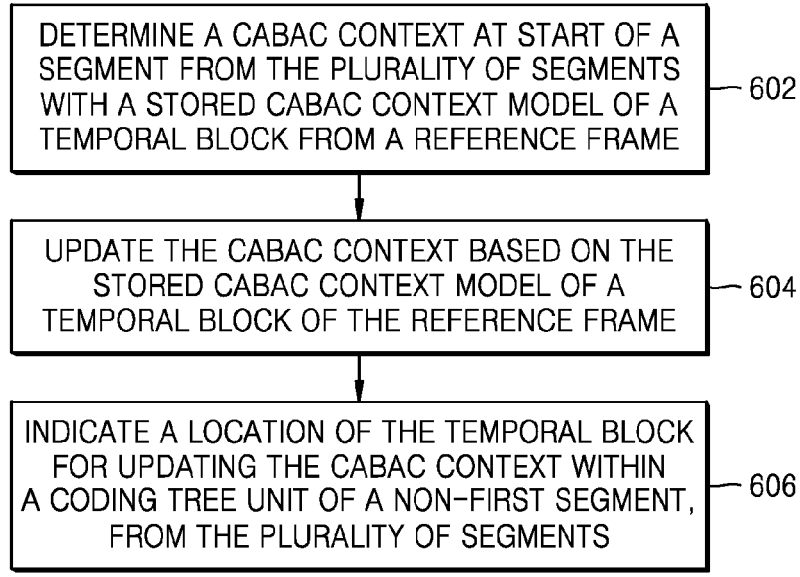
[Fig. 7]
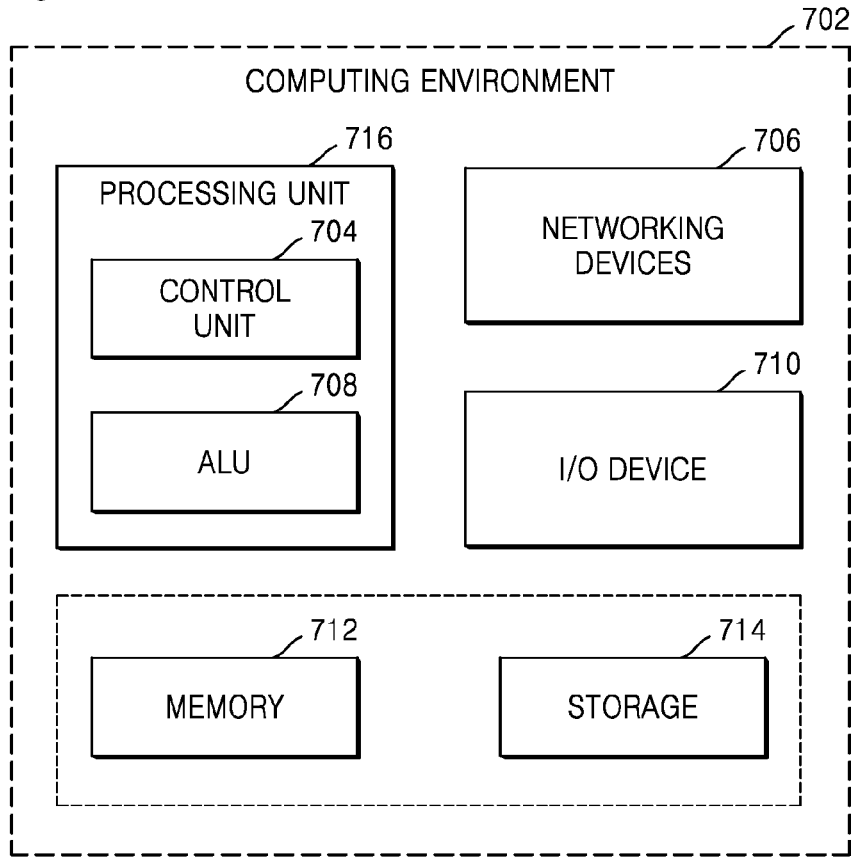

METHOD AND ELECTRONIC DEVICE FOR CODING A SEGMENT OF AN INTER FRAME

TECHNICAL FIELD

The example embodiments herein generally relate to an image coding method. More particularly, to a method and electronic device for coding a segment of an inter frame. The present application is based on and claims priority from Indian Application Number 201641015895, filed on May 6, 2016, the disclosure of which is hereby incorporated by reference herein.

BACKGROUND ART

In existing image/video coding methods, a single image is divided into a plurality of tiles and an encoding scheme is decided for each tile. The tiles are decodable in parallel by breaking the coding and context dependencies at the boundaries. The dependencies between tiles are disabled in the same manner disabling dependencies between slices. Specifically, in entropy coding and reconstruction dependencies, motion vector prediction, intra prediction and context selection are not allowed between tiles. Motion vector prediction, intra prediction and context selection result in an increase in the number of bits required to encode motion information and residual of those blocks present at tile boundaries and also result in introduction of visual artifacts near tile boundaries.

Due to the above restriction, merge spatial candidates are not available across tile boundaries, and hence merge modes are handicapped at tile boundaries. Similarly, cabac context is reset at the start of each tile or slice or any other partitioning due to the break in dependencies at the tile boundaries.

The above information is presented as background information only to help the reader to understand the present invention. Applicants have made no determination and make no assertion as to whether any of the above might be applicable as Prior Art with regard to the present application.

DISCLOSURE

The principal object of the example embodiments herein is to provide a method and electronic device for coding a segment of an inter frame.

Another object of the example embodiments herein is to provide a method for partitioning a current frame into a plurality of segments.

Another object of the example embodiments herein is to provide a method for coding a current spatial block at a boundary of a segment included among the plurality of segments by deriving at least one new temporal motion information predictor candidate from a reference frame.

Yet another object of the example embodiments herein is to provide a method for determining a context adaptive binary arithmetic coding (cabac) context at the start of a segment of a current frame based on a stored cabac context model of a temporal block from a reference frame.

Yet another object of the example embodiments herein is to provide a method for updating the cabac context based on the stored cabac context model of a temporal block of the reference frame, wherein the temporal block is derived from the reference frame at the start of the segment of the current frame.

Yet another object of the example embodiments herein is to provide a method for indicating a location of the temporal block for updating the cabac context within a first coding tree unit of a non-first segment included among the plurality of segments, when the location of the temporal block is not identified directly when the temporal block is derived from the reference frame by searching a temporal region for the temporal block with the best cabac context model.

DESCRIPTION OF DRAWINGS

This invention is illustrated in the accompanying drawings, throughout which like reference letters indicate corresponding parts in the various figures. The example embodiments herein will be better understood from the following description with reference to the drawings, in which:

FIG. 1 illustrates a block diagram of an electronic device for coding a segment of an inter frame, according to an example embodiment as disclosed herein;

FIG. 2a illustrates temporal blocks at segment boundaries of a reference frame, according to an example embodiment as disclosed herein;

FIG. 2b illustrates spatial blocks at segment boundaries of a current frame, according to an example embodiment as disclosed herein;

FIG. 3a is an example scenario in which a temporal motion information predictor candidate is derived based on a block matching technique, according to an example embodiment as disclosed herein;

FIG. 3b is an example scenario in which a spatial block is considered for a block matching technique, according to an example embodiment as disclosed herein;

FIGS. 4a-4b illustrates boundary blocks at the start of segments requiring cabac context initialization, according to example embodiments as disclosed herein;

FIG. 5 is a flowchart illustrating a method for coding a segment of an inter frame, according to an example embodiment as disclosed herein;

FIG. 6 is a flowchart illustrating a method for updating a cabac context of a segment, according to an example embodiment as disclosed herein;

and

FIG. 7 illustrates a computing environment implementing the method and system for coding a segment of an inter frame, according to an example embodiment as disclosed herein.

BEST MODE

Accordingly the example embodiments herein provide a method for coding a segment of an inter frame. The method includes partitioning, by a partition unit, a current frame into a plurality of segments. Further, the method includes coding, by a coding unit, a current spatial block at a boundary of a segment included among the plurality of segments by deriving at least one new temporal motion information predictor candidate from a reference frame.

In an example embodiment, the coding includes deriving the at least one new temporal motion information predictor candidate for the current spatial block from the reference frame when spatial neighbor blocks are unavailable for the current spatial block at the boundary of the segment of the current frame.

In an example embodiment, the at least one new temporal motion information predictor candidate is derived based on a temporal block of the reference frame, wherein the temporal block is derived from the reference frame for the spatial neighbor blocks which are unavailable for the current spatial block at the boundary of the segment of the current frame.

In an example embodiment, the at least one new temporal motion information predictor candidate is derived, by the prediction unit, based on a block matching technique, wherein the prediction unit indicates a location of the temporal block of the at least one new temporal motion information predictor candidate in a syntax to the coding unit.

In an example embodiment, the temporal block is one of a collocated temporal block, a collocated temporal sub-block, a non-collocated temporal block, and a non-collocated temporal sub-block.

In an example embodiment, the method further includes storing motion information of the temporal block in a memory, and determining at least one temporal motion information predictor candidate for a spatial block for one of other segments of the current frame and segments of the other frames based on the stored motion information when the spatial neighbor blocks are unavailable.

In an example embodiment, the method further includes adding the at least one new temporal motion information predictor candidate at one of a start position, an end position, and a customized position in a merge list when a merge mode of motion information coding is applied by the coding unit.

In an example embodiment, the method further includes determining, by a coding unit, a cabac context at the start of the segment of the current frame based on a stored cabac context model of a temporal block from the reference frame. Further, the method includes updating the cabac context based on the stored cabac context model of a temporal block of the reference frame, wherein the temporal block is derived from the reference frame at the start of the segment of the current frame. Further, the method includes indicating a location of the temporal block for updating the cabac context within a first coding tree unit of a non-first segment included among the plurality of segments, when the location of the temporal block is not identified directly when the temporal block is derived from the reference frame by searching a temporal region for the temporal block with the best cabac context model.

In an example embodiment, the temporal block is determined by the coding unit and is indicated within the first coding tree unit in a syntax at segment level for non-first segments of the current frame.

Accordingly the example embodiments herein provide an electronic device for coding a segment of an inter frame. The electronic device includes a memory, a processor, coupled to the memory, a partition unit, coupled to the processor, and a coding unit, coupled to the processor unit. The partition unit is configured to partition a current frame into a plurality of segments. The coding unit is configured to code a current spatial block at a boundary of a segment included among the plurality of segments by deriving at least one new temporal motion information predictor candidate from a reference frame. Further, the coding unit is configured to determine a cabac context at the start of the segment of the current frame based on a stored cabac context model of a temporal block from the reference frame. Further, the coding unit is configured to update the cabac context based on the stored cabac context model of the temporal block of the reference frame, wherein the temporal block is derived from the reference frame at the start of the segment of the current frame. Further, the coding unit is configured to indicate a location of the temporal block for updating the cabac context within a first coding tree unit of a non-first segment included among the plurality of segments, when the location of the temporal block is not identified directly when the temporal block is derived from the reference frame by searching a temporal region for the temporal block with the best cabac context model.

These and other aspects of the example embodiments herein will be better appreciated and understood when considered in conjunction with the following description and the accompanying drawings. It should be understood, however, that the following descriptions, while indicating preferred example embodiments and numerous specific details thereof, are given by way of illustration and not of limitation. Many changes and modifications may be made within the scope of the example embodiments herein without departing from the spirit thereof, and the example embodiments herein include all such modifications.

MODE FOR INVENTION

The example embodiments herein and the various features and advantageous details thereof are explained more fully with reference to the non-limiting example embodiments that are illustrated in the accompanying drawings and detailed in the following description. Descriptions of well-known components and processing techniques are omitted so as to not unnecessarily obscure the example embodiments herein. Also, the various example embodiments described herein are not necessarily mutually exclusive, as some example embodiments can be combined with one or more other example embodiments to form new example embodiments. The term "or" as used herein, refers to a non-exclusive or, unless otherwise indicated. The examples used herein are intended merely to facilitate an understanding of ways in which the example embodiments herein can be practiced and to further enable those skilled in the art to practice the example embodiments herein. Accordingly, the examples should not be construed as limiting the scope of the example embodiments herein.

The example embodiments herein disclose a method for coding a segment of an inter frame. The method includes partitioning a current frame into a plurality of segments. Further, the method includes coding a current spatial block at a boundary of a segment included among the plurality of segments by deriving at least one new temporal motion information predictor candidate from a reference frame.

Unlike the conventional methods, the proposed method includes coding of the spatial blocks at the boundary of the segment from the plurality of segments by deriving the temporal motion information predictor candidates from the reference frame.

Unlike the conventional methods, the proposed method includes temporal motion information prediction and context selection based on a stored cabac context model of a temporal block of the reference frame at the boundary of the segment. As a result, a smaller number of bits is required to encode the temporal motion information.

Unlike the conventional methods, the proposed method includes utilizing a syntax flag to indicate use of the reference frame to obtain the temporal motion information predictor candidates and context adaptive binary arithmetic coding (cabac) context offset.

Referring now to the drawings, FIGS. 1 through 7, where similar reference characters denote corresponding features consistently throughout the figures, aspects of preferred example embodiments are illustrated.

FIG. 1 illustrates a block diagram of an electronic device 102 for coding a segment of an inter frame, according to an example embodiment as disclosed herein. In an example embodiment, the electronic device 102 can be, for example, but is not limited to, a mobile phone, a smart phone, Personal Digital Assistants (PDAs), a tablet, a phablet, a smart appliance, a television, a camera, a coding circuit capable of coding and decoding the image/frame, a consumer electronic device, a monitor, a dual display device, or any other electronic device.

The electronic device 102 may operate in accordance with various video coding standards, a proprietary standard, or any other way of multiview coding. In an example embodiment, video coding standards may include, for example, but are not limited to, ITU-T H.261, High Efficiency Video Coding (HEVC), ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) or Multiview Video Coding (MVC) extensions.

The electronic device 102 includes a partition unit 104, a coding unit 106, a prediction unit 108, a processor unit 110, a memory unit 112, and a communication unit 114. The partition unit 104, coupled to the processor unit 110, may be configured to partition a current frame into a plurality of segments (e.g., T0, T1, T2, and T3 as shown in FIG. 2a). A segment can be, for example, but is not limited to, a tile, a slice, or any other partitioning of the current frame. Further, the heights of the segments can be set to different or equal values, and the width of each segment can be set to a different value or equal value. In an example embodiment, blocks at the segment boundaries (for example, in both the reference frame and the current frame) require neighboring data (e.g., data from neighboring frames) for coding. The blocks at the segment boundaries are coded by the coding unit 106.

The coding unit 106 can be configured to code the current spatial block at the boundary of the segment from the plurality of segments by deriving at least one new temporal motion information predictor candidate from the reference frame. The temporal motion information predictor candidate may be motion vector information of the temporal block of the reference frame, and the motion vector information may be derived by the prediction unit 108. The motion vector information may include, for example, the reference frame index, or a prediction direction indicator. The reference frame is a frame which is coded previously (or, e.g., historically coded frame).

The electronic device 102 may derive the at least one new temporal motion information predictor candidate for the current spatial block from the reference frame when spatial neighbor blocks are unavailable for the current spatial block at the boundary of the segment of the current frame. The temporal motion information predictor candidate is derived based on the temporal block of the reference frame, wherein the temporal block is derived from the reference frame for the spatial neighbor blocks which are unavailable for the current spatial block at the boundary of the segment of the current frame.

The temporal block may be one of a collocated temporal block, a collocated temporal sub-block, a non-collocated temporal block, and a non-collocated temporal sub-block. In an example embodiment, motion information of the temporal block is stored in the memory unit 112, and a temporal motion information predictor candidate for the spatial block for one of other segments of the current frame and segments of other frames may be determined by the prediction unit 108 based on the stored motion information when the spatial neighbor blocks are unavailable. In an example embodiment, the electronic device 102 may add the temporal motion information predictor candidate at one of a start position, an end position, and a customized position in a merge list when a merge mode of motion information coding is applied by the coding unit 106. Addition of the temporal motion information predictor candidate is explained in conjunction with FIGS. 4a-4b.

Further, the prediction unit 108 can be configured to derive the temporal motion information predictor candidate by utilizing a block matching technique. Further, the prediction unit 108 can be configured to predict a location of the temporal block of the temporal motion information predictor candidate based on a syntax, and inform the coding unit 106 of the predicted location. The block matching technique is explained in conjunction with FIGS. 3a-3b.

Further, the coding unit 106 can be configured to determine the cabac context at the start of the segment of the current frame based on a stored cabac context model of the temporal block from the reference frame. Further, the coding unit 106 can be configured to update the cabac context based on the stored cabac context model of the temporal block of the reference frame, wherein the temporal block is derived from the reference frame at the start of the segment of the current frame. Further, the coding unit 106 can be configured to indicate the location of the temporal block for updating the cabac context within a first coding tree unit (not shown) of a non-first segment included among the plurality of segments, when the location of the temporal block is not identified directly or when the temporal block is derived from the reference frame by searching a temporal region for the temporal block with the best cabac context model.

The coding unit 106 can be configured to determine the temporal block, and the temporal block is indicated within the coding tree unit in the syntax at segment level for the non-first segments of the current frame.

The processor 110 may be, for example, a hardware unit, an apparatus, a Central Processing Unit (CPU), or a Graphics Processing Unit (GPU)) communicatively coupled to the memory 112 (e.g., a volatile memory and/or a non-volatile memory). The memory includes storage locations addressable through the processor 110. Further, the memory 112 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 112 may, in some examples, be a non-transitory storage medium. The term "non-transitory" may indicate that the storage medium is not embodied in a carrier wave or a propagated signal. However, the term "non-transitory" should not be interpreted to mean that the memory 112 is non-movable. In some examples, the memory size of the memory 112 can be increased. In certain examples, a non-transitory storage medium may store data that can, over time, change (e.g., in Random Access Memory (RAM) or cache). The communication unit 114 can be configured for communicating internally between the units and externally with the networks.

FIG. 1 shows a limited overview of the electronic device 102, but it is to be understood that other example embodiments are not limited thereto. Further, the electronic device 102 can include any number of units along with other hardware or software components communicating with each other. For example, the components can be, but are not limited to, a process running in the controller or processor, an object, an executable process, a thread of execution, a program, or a computer. By way of illustration, both an application running on a device and the device itself can be a component.

FIG. 2a illustrates the temporal blocks at segment boundaries, of a reference frame 200a, according to an example embodiment as disclosed herein.

As shown in FIG. 2a, the reference frame 200a is divided, by the partition unit 104, into a plurality of segments (e.g., T0, T1, T2, and T3). The reference frame 200a includes temporal blocks (202a1, 202a2, . . . 202a6) at the segment boundary 204a. The temporal blocks can be divided into sub-blocks. The collocated blocks neighboring 202a4 are denoted as 206a.

As shown in FIG. 2b, the current frame 200b is partitioned by the partition unit 104, into the plurality of segments (e.g., T0, T1, T2, and T3). The current frame includes spatial blocks (202b1, 202b2, . . . 202b6) at the segment boundary 204b, spatial neighboring blocks 206b, and a current spatial block is denoted as 208b. The current spatial block 208b requires spatial neighboring data for motion information coding.

In an example embodiment, the current spatial block 208b, shown in FIG. 2b, is considered for coding. In another embodiment, the spatial neighboring blocks 206b (which are unavailable due to segment boundaries) of the current spatial block 208b, as shown in FIG. 2b, are required to form a merge list. The collocated blocks 206a in reference frame 200a, as shown in FIG. 2a, are located at the same co-ordinates (x, y) as the neighboring blocks around the current spatial block 208b. The collocated blocks 206a may be used as merge candidates.

In conventional electronic devices and methods, for segment coding, if the neighboring data of the current spatial block 208b at the segment boundary 204b is not available, a merge list may not be utilized to derive the at least one new temporal motion information predictor candidate using collocated temporal blocks 206a from the reference frame 200a, and in such a case, a merge mode may require more bits. Unlike the conventional electronic devices and methods, in the proposed electronic device 102, the neighboring data of the current spatial block 208b at the boundary 204b are made available from previously decoded reference frame 200a by deriving the at least one new temporal motion information predictor candidate. The temporal blocks or sub-blocks 206a derived from the reference frame 200a corresponding to the spatially unavailable blocks or sub-blocks 206b for the current spatial block 208b at the boundary 204b are used to fetch new temporal merge candidates (i.e., the temporal motion information predictor candidate)). The electronic device 102 may add new temporal motion information predictor candidates at one of a start position, an end position, and a customized position in the merge list according to a merge mode of motion information coding applied by the coding unit 106.

The prediction unit 108 indicates the location of the temporal block of the temporal motion information predictor candidate in the syntax, and the coding unit 106 determines the location of the temporal block of the temporal motion information predictor candidate based on the syntax.

The syntax flag at block level indicates the type of merge list derivation. In an example embodiment, the syntax flag at block level may be used. When a new signaling syntax flag is not used, the proposed modified merge list derivation is performed at a segment boundary. The proposed method can be extended to other motion information coding modes (e.g., advanced motion vector prediction (AMVP)) apart from merge mode.

FIG. 3a is an example scenario in which the temporal motion information predictor candidate is derived based on the block matching technique, according to an example embodiment as disclosed herein. FIG. 3b is an example scenario in which the spatial block is considered for the block matching technique, according to an example embodiment as disclosed herein. As shown in FIG. 3b, 202b4 is a neighboring block included among the blocks (202b1, 202b2, . . . 202b6) at the segment boundary 204b which is available for coding the current spatial block 302b at the segment boundary 204b which is common to the plurality of segments (T0, T1, T2, T3). The segment boundary 204b is used to derive a temporal motion information predictor candidate from the reference frame 200a. The available (top/left) neighboring block 202b4 of the current spatial block 302b, shown in FIG. 3b, is used for searching. A temporal block is searched for in the reference frame 200a (shown in FIG. 3a as a dotted square region) by using a Block matching technique (BMA) to find the best match for the current spatial block 302b from among available neighboring blocks of the current spatial block 302b. The prediction unit 108 indicates the location of the temporal block of the temporal motion information predictor candidate in the syntax to the coding unit 106. The motion information of the best-matched reference temporal block is added as a new candidate into the merge list. In another embodiment, the reference block best matching the current spatial block 302b as found based on the search may or may not be added to the merge list.

Further, a decoder unit (not shown) may use the BMA technique to derive the best-matched merge candidate. Otherwise, the x and y co-ordinate of best-matching reference block can be indicated in a syntax at the block level if the decoder does not perform BMA to find the best-matching reference block.

The syntax flag (e.g., tile_boundary_merge_cand_flag) is sent to a decoder unit (not shown) at block level, and the syntax flag indicates whether the proposed merge list derivation process is to be performed. If "merge_flag" is 1 and the syntax flag is also 1, then the collocated or suitable non-collocated reference blocks are used to derive new temporal merge candidates, and additionally, a best-matched reference block may be derived as a new candidate.

If "merge_flag" is 0, then the existing merge list derivation occurs without the proposed method. In another embodiment, the syntax flag may be omitted, in which case the proposed modified merge list derivation is performed at a segment boundary or slice or any other partitioning type of frame and the new merge candidates may be added in any order at any position (e.g., at start or end) in the merge list.

In an example embodiment, to derive the best matched temporal motion information predictor candidate, which forms the new merge candidate, from the temporal block of the reference frame 200a in FIG. 3a, two techniques are proposed for deriving the best matched reference block candidate at the decoder.

Technique—1: by Motion Estimation (ME)/BMA based derivation of motion information of the best-matched temporal block from the reference frame 200a.

Technique—2: by indicating the (x, y) position coordinate of the best-matched temporal block from the reference frame 200a through syntax.

FIGS. 4a-4b illustrate the boundary blocks at the start of segments requiring cabac context initialization, according to an example embodiment as disclosed herein. The spatial blocks (202b1, 202b6) at the segment boundary 204b are shown in FIG. 4b. The boundary block (b1, b2 and b3) of each segment, shown in FIG. 4b, requires cabac context initialization. The existing segment limitation forces context to be reset at the start of each segment. The proposed method includes determining the context at the start (b1, b2 and b3) of the segment(s) (T2, T3, and T1) of the current frame 200b based on the stored cabac context model of the temporal blocks (a1, a2 and a3) from the reference frame 200a. Further, the proposed method includes updating the cabac context based on the stored cabac context model of the temporal block of the reference frame 200a, wherein the temporal block is derived from the reference frame 200a at the start of the segment of the current frame. Further, the method includes indicating the location of the temporal block for updating the cabac context within the first coding tree unit of a non-first segment included among the plurality of segments, when the location of the temporal block is not identified directly or/and when the temporal block is derived from the reference frame by searching a temporal region for the temporal block with the best cabac context model. The temporal block is determined by the coding unit 106 and is indicated within the coding tree in the syntax at segment level for the non-first segments of the current frame.

The temporal block from the reference frame 200a can be a collocated or suitable non-collocated neighbor or best matched reference block found using the BMA technique. If the best matched block is used to update cabac context, then the x-y coordinates for the best matched block are sent in the syntax.

FIG. 5 is a flowchart illustrating a method for coding the segment of an inter frame, according to an example embodiment as disclosed herein. At step 502, the method includes partitioning the current frame 200b into the plurality of segments. The method allows the partition unit 104 to partition the current frame 200b into the plurality of segments. At step 504, the method includes coding the current spatial block at a boundary of a segment included among the plurality of segments by deriving at least one new temporal motion information predictor candidate from the reference frame 200a. The method allows the coding unit 106 to code the current spatial block at a boundary of a segment included among the plurality of segments by deriving at least one new temporal motion information predictor candidate from the reference frame 200a.

The various actions, acts, blocks, steps, or the like in the flowchart may be performed in the order presented, in a different order or simultaneously. Further, in some example embodiments, some of the actions, acts, blocks, steps, or the like may be omitted, added, modified, skipped, or the like without departing from the scope of the invention.

FIG. 6 is a flowchart illustrating a method for updating the cabac context of the segment, according to an example embodiment as disclosed herein. At step 602, the method includes determining the cabac context at the start of the non-first segment of the current frame 200b based on the stored cabac context model of the temporal block from the reference frame 200a. The method allows the coding unit 106 to determine the cabac context at the start of the non-first segment of the current frame 200b based on the stored cabac context model of the temporal block from the reference frame 200a.

At step 604, the method includes updating the cabac context based on the stored cabac context model of the temporal block of the reference frame 200a, wherein the temporal block is derived from the reference frame 200a at the start of the non-first segment of the current frame 200b. The method allows the coding unit 106 to update the cabac context based on the stored cabac context model of the temporal block of the reference frame 200a, wherein the temporal block is derived from the reference frame 200a at the start of the non-first segment of the current frame 200b.

At step 606, the method includes indicating the location of the temporal block for updating the cabac context within a first coding tree unit of the non-first segment included among the plurality of segments, when the location of the temporal block is not identified directly and/or when the temporal block is derived from the reference frame 200a by searching a temporal region for the temporal block with the best cabac context model. The method allows the coding unit 106 to indicate the location of the temporal block for updating the cabac context within a first coding tree unit of the non-first segment included among the plurality of segments, when the location of the temporal block is not identified directly and/or when the temporal block is derived from the reference frame 200a by searching a temporal region for the temporal block with the best cabac context model.

The various actions, acts, blocks, steps, or the like in the flowchart may be performed in the order presented, in a different order or simultaneously. Further, in some example embodiments, some of the actions, acts, blocks, steps, or the like may be omitted, added, modified, skipped, or the like without departing from the scope of the invention.

FIG. 7 illustrates a computing environment implementing the method and system for coding a segment of an inter frame, according to an example embodiment as disclosed herein. As depicted in the FIG. 7, the computing environment 702 includes at least one processing unit 716 equipped with a control unit 704 and an Arithmetic Logic Unit (ALU) 708, a memory 712, a storage unit 714, plurality of networking devices 706 and a plurality Input output (I/O) devices 710. The processing unit 716 is responsible for processing the instructions of the schemes. The processing unit 716 processes commands received from the control unit 704. Further, any logical and arithmetic operations involved in the execution of the instructions are computed with the help of the ALU 708.

The overall computing environment 702 can be composed of multiple homogeneous or heterogeneous cores, multiple CPUs of different kinds, special media and other accelerators. The processing unit 716 is responsible for processing the instructions of the schemes. Further, the plurality of processing units 716 may be located on a single chip or multiple chips.

The scheme comprising of instructions and codes required for the implementation may be stored in either the memory unit 712 or the storage 714 or both. At the time of execution, the instructions may be fetched from the corresponding memory 712 or storage 714, and executed by the processing unit 716.

Further, storage 714 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage 714 may, in some examples, be considered a non-transitory storage medium. The term "non-transitory" may indicate that the storage medium is not embodied in a carrier wave or a propagated signal. However, the term "non-transitory" should not be interpreted that the storage 714 is non-movable. In some examples, the storage 714 can be configured to store larger amounts of information than the memory. In certain examples, a non-transitory storage medium may store data that can, over time, change (e.g., in Random Access Memory (RAM) or cache).

In case of any hardware implementations various networking devices 706 or external I/O devices 710 may be connected to the computing environment to support the implementation through the networking unit and the I/O device unit.

The example embodiments disclosed herein can be implemented through at least one software program running on at least one hardware device and performing network management functions to control the elements. The elements shown in the FIGS. 1 through 7 include blocks which can be at least one of a hardware device, or a combination of hardware device and software units.

The foregoing description of the specific example embodiments will so fully reveal the general nature of the example embodiments herein that others can, by applying current knowledge, readily modify or adapt for various applications such specific example embodiments without departing from the generic concept, and, therefore, such adaptations and modifications should and are intended to be comprehended within the meaning and range of equivalents of the disclosed example embodiments. It is to be understood that the phraseology or terminology employed herein is for the purpose of description and not of limitation. Therefore, while the example embodiments herein have been described in terms of preferred example embodiments, those skilled in the art will recognize that the example embodiments herein can be practiced with modification within the spirit and scope of the example embodiments as described herein.

The invention claimed is:

1. An electronic device for coding a segment of an inter frame, the electronic device comprising:
   a partition unit configured to partition a current frame into a plurality of segments; and
   a coding unit configured to code a current spatial block at a boundary of a segment included among the plurality of segments by determining a cabac context at a start of the segment of the current frame based on a stored cabac context model of a temporal block from a reference frame, and updating the cabac context based on the stored cabac context model of the temporal block of the reference frame,
   wherein the temporal block is derived from the reference frame at the start of the segment of the current frame.

2. The electronic device of claim 1, further comprising a prediction unit configured to derive at least one new temporal motion information predictor candidate for the current spatial block from the reference frame when spatial neighbor blocks are unavailable for the current spatial block at the boundary of the segment of the current frame.

3. The electronic device of claim 2, wherein the prediction unit is configured to derive the at least one new temporal motion information predictor candidate based on the temporal block of the reference frame, wherein the temporal block is derived from the reference frame for the spatial neighbor blocks which are unavailable for the current spatial block at the boundary of the segment of the current frame.

4. The electronic device of claim 3, wherein the at least one new temporal motion information predictor candidate is derived, by the prediction unit, based on a block matching technique, wherein the prediction unit indicates a location of the temporal block of the at least one new temporal motion information predictor candidate based on a syntax and inform the coding unit of the predicted location.

5. The electronic device of claim 3, wherein the temporal block is one of a collocated temporal block, a collocated temporal sub-block, a non-collocated temporal block, and a non-collocated temporal sub-block.

6. The electronic device of claim 3, wherein
   the electronic device further comprises a memory configured to store motion information of the temporal block; and
   the prediction unit is further configured to determine at least one temporal motion information predictor candidate for a spatial block for one of other segments of the current frame and segments of other frames based on the stored motion information when the spatial neighbor blocks are unavailable.

7. The electronic device of claim 6, wherein the electronic device is configured to add the at least one new temporal motion information predictor candidate at one of a start position, an end position, and a customized position in a merge list when a merge mode of motion information coding is applied by the coding unit.

8. The electronic device of claim 1, wherein the coding unit is further configured to:
   indicate a location of the temporal block for updating the cabac context within a first coding tree unit of a non-first segment included among the plurality of segments, when the location of the temporal block is not identified directly when the temporal block is derived from the reference frame by searching a temporal region for the temporal block with a best cabac context model.

9. The electronic device of claim 8, wherein the temporal block is determined by the coding unit and is indicated within the first coding tree unit in a syntax at segment level for non-first segments of the current frame.

10. A method for coding a segment of an inter frame, the method comprising:
   partitioning, by a partition unit, a current frame into a plurality of segments; and
   coding, by a coding unit, configured to code a current spatial block at a boundary of a segment included among the plurality of segments by determining a cabac context at a start of the segment of the current frame based on a stored cabac context model of a temporal block from a reference frame, and updating the cabac context based on the stored cabac context model of the temporal block of the reference frame,
   wherein the temporal block is derived from the reference frame at the start of the segment of the current frame.

11. The method of claim 10, wherein the coding includes deriving at least one new temporal motion information predictor candidate for the current spatial block from the reference frame when spatial neighbor blocks are unavailable for the current spatial block at the boundary of the segment of the current frame.

12. The method of claim 11, wherein the at least one new temporal motion information predictor candidate is derived based on the temporal block of the reference frame, wherein the temporal block is derived from the reference frame for the spatial neighbor blocks which are unavailable for the current spatial block at the boundary of the segment of the current frame.

13. The method of claim 12, wherein the at least one new temporal motion information predictor candidate is derived, by a prediction unit, based on a block matching technique, wherein the prediction unit indicates a location of the temporal block of the at least one new temporal motion information predictor candidate in a syntax and inform the coding unit of the predicted location.

14. The method of claim 10, wherein the coding further comprises:

indicating a location of the temporal block for updating the cabac context within a first coding tree unit of a non-first segment included among the plurality of segments, when the location of the temporal block is not identified directly when the temporal block is derived from the reference frame by searching a temporal region for the temporal block with a best cabac context model.

15. The method of claim 14, wherein the temporal block is determined by the coding unit and is indicated within the first coding tree unit in a syntax at segment level for non-first segments of the current frame.

16. A method for decoding a segment of an inter frame, the method comprising:

determining a plurality of segments partitioned from a current frame; and decoding a current spatial block at a boundary of a segment included among the plurality of segments by determining a cabac context at a start of the segment of the current frame based on a stored cabac context model of a temporal block from a reference frame, and updating the cabac context based on the stored cabac context model of the temporal block of the reference frame, wherein the temporal block is derived from the reference frame at the start of the segment of the current frame.

* * * * *